United States Patent [19]
Duffy et al.

[11] Patent Number: 5,237,816
[45] Date of Patent: Aug. 24, 1993

[54] STEAM GENERATOR CONTROL SYSTEMS

[75] Inventors: Thomas E. Duffy, San Diego; Alan H. Campbell, Encinitas; O. Leon Lindsey, La Mesa, all of Calif.

[73] Assignee: Solar Turbines Incorporated, San Diego, Calif.

[21] Appl. No.: 687,814

[22] Filed: Dec. 31, 1984

Related U.S. Application Data

[63] Continuation of Ser. No. 497,132, May 23, 1983, abandoned.

[51] Int. Cl.$^5$ ............................................. F01K 13/02
[52] U.S. Cl. ................................. 60/39.182; 60/665; 60/667
[58] Field of Search .................. 122/7 R; 60/39.182, 60/664, 665, 667, 655

[56] References Cited

U.S. PATENT DOCUMENTS

| | | | |
|---|---|---|---|
| 3,306,044 | 2/1967 | Michel et al. | 60/662 |
| 3,488,961 | 1/1970 | Gerber | 60/662 |
| 4,353,215 | 10/1982 | Anderson et al. | 60/662 |
| 4,445,462 | 5/1984 | Mastronarde | 122/7 R |

FOREIGN PATENT DOCUMENTS 0114837  9/1980  Japan ................................. 60/39.182

OTHER PUBLICATIONS

Wardall et al., "The Outlook for Combined Cycle Efficiency with Small Turbines"; Energy Processing/Canada Mar.-Apr. 1976.

*Primary Examiner*—Allen M. Ostrager
*Attorney, Agent, or Firm*—Hughes, Cassidy & Multer

[57] ABSTRACT

Control systems (or controllers) for once through, unfired steam generators (or boilers) which control a single parameter—the feedwater flow to the boiler—in accord with an energy or enthalpy balance between the hot gases supplied to the boiler and the steam generated in it. These control systems have a predictive mode of feedwater control and, optionally, an operator selectable, feedback mode to compensate for drifts in the predictive mode. Other corrections may also be made, and predictive and corrective flow splits can be provided to obtain maximum efficiency when the control system is utilized to regulate the operation of a dual pressure boiler.

9 Claims, 5 Drawing Sheets

STEAM GENERATOR CONTROL SYSTEMS

This is a continuation of application Ser. No. 497,132, filed May 23, 1983 now abandoned.

This invention relates to control systems and, more particularly, to novel, improved control systems for unfired steam generators (or boilers) of the once-through type.

One presently important application of the invention is in combined cycle power plants, and the principles of the present invention will accordingly be developed primarily with reference to that application (a combined cycle power plant is one in which thermal energy contained in the exhaust gases of a gas turbine engine is recovered and converted to mechanical energy by using those gases to generate steam and employing the steam as the motive fluid for a steam turbine).

It is to be understood that the foregoing approach is being adopted for purposes of brevity and clarity and that it is not intended to limit the scope of protection to which we consider ourselves entitled. For example, the boiler controlled by a system employing the principles of the present invention may be operated on waste heat from an industrial process rather than exhaust gases from a turbine engine.

BACKGROUND OF THE INVENTION AND PRIOR ART

Conventional steam boilers have a number of economic shortcomings and cause many operating problems in combined cycle applications, particularly those of small capacity using gas turbines in the 4000–25000 Kw range. Among the major contributors to these drawbacks are the complex systems utilized to control the operation of combined cycle power plant boilers (typical prior art control systems for combined cycle power plants are disclosed in U.S. Pat. Nos. 3,505,811 to Underwood and 2,965,765 to Martz et al).

The complex prior art boiler control systems tend to have large numbers of components that are subject to malfunction which makes maintenance costs high and reduces boiler availability. Also, attended operation may be required for safe and efficient boiler operation.

DISCLOSURE OF THE INVENTION

In contrast, there have now been discovered and disclosed herein certain novel boiler control systems (or controllers) which are free of the foregoing and other disadvantages of typical heretofore proposed boiler control systems. Instead, the herein disclosed boiler operation controllers are simple, reliable, inexpensive, and capable of providing safe and efficient unattended boiler operation.

These novel controllers are designed around the philosophy that an unfired boiler can be so controlled as to efficiently produce steam of acceptable quality by regulating a single operating parameter; viz., the flow of feedwater to the boiler. An energy or enthalpy balance is struck between the hot gases supplied to the boiler and steam at a specified temperature relative to the temperature of those gases (the approach temperature) because steam quality and boiler efficiency are closely related to steam temperature, and the flow of feedwater is so regulated that the steam is produced at the selected (approach setpoint) temperature.

The desirability of efficient boiler operation is obvious. Insuring that only steam of a quality insuring that the steam is dry as produced is also important, especially in applications where the steam is utilized to drive a turbine because of the well-known deleterious effects such as cavitation that water carried over to a steam turbine can cause.

Physically, the controller takes the form of a processor which calculates the feedwater flow needed to satisfy the energy balance equation in a predictive fashion so that fast response to changes in the amount of energy supplied to the steam generator can be obtained.

Feedback from the steam side of the boiler can be selectively employed to compensate for drift in the predictive mode of operation of the controller. This insures that the approach temperature is maintained and, consequentially, that steam with an acceptable margin of superheat is produced and that the recovery of thermal energy is maximized.

Preferably, provision is also made for measuring the actual flow of feedwater to the steam generator. This information is compared with the predictive flow and, if there is a discrepancy, an error signal is generated and used to correct the feedwater flow to the predictive value or that value as modified by feedback information from the steam side of the boiler.

The novel feedwater flow controllers disclosed herein can be utilized to control the operation of dual pressure boilers as well as those which produce steam at a single pressure. In dual pressure applications the controller is preferably programmed or modified to maintain a particular split or ratio between the flow of feedwater to the high pressure circuits of the boiler and the flow of feedwater to the low pressure circuits. This control strategy produces another significant increase in boiler operating efficiency.

Feedback information from the steam side of the boiler is preferably made selectively available in dual pressure operations, and measurement of the actual feedwater flow for the purposes discussed above is also provided.

Several features and advantages of the novel controllers disclosed herein were discussed above. Another, obtained because these controllers subordinate or slave the boiler operation to the operation of the process, gas turbine engine, etc. which furnishes the thermal energy for producing steam in the boiler, is significant simplification of the boiler control strategy.

Yet another important advantage of the disclosed controllers is that effective and efficient boiler operation is maintained over a wide heat producer operating range. In the case of a combined cycle power plant, for example, a controller operating in the modes discussed above is capable of maintaining a safe degree of superheat and efficient boiler operation from full load on the turbine down to 25 percent load or lower.

Reliability and maintainability are additional hallmarks of the controllers disclosed herein. Availability will typically exceed 99 percent of the boiler operating hours, and maintenance is easily performed because the controller can be constructed in modular form.

OBJECTS OF THE INVENTION

From the foregoing, it will be apparent to the reader that the primary object of the invention resides in the provision of novel, improved systems for controlling the operation of an unfired, once through steam generator or boiler.

Other, also important but more specific, objects of the invention reside in the provision of systems in accord with the preceding object:

which have a wide range of applications and which, in that regard, are not tied to a particular type of thermal energy source;

which insure that the boiler will operate safely and efficiently during transient operating conditions of the thermal energy source and over a wide operating range of the energy source;

which are capable of insuring that only dry steam is produced in the steam generator;

which subordinate the operation of the steam generator to the operation of that process or other source which supplies thermal energy to the steam generator;

which employ a simple control strategy;

in which, in conjunction with the preceding object, only a single boiler operating parameter is controlled;

which employ a predictive control strategy to insure that the goal of producing dry steam with maximum efficiency is met;

in which, in conjunction with the preceding object, selectively useable feedback information can be made available from the steam side of the boiler to compensate for drift encountered in the predictive mode of operation;

in which provision is made for comparing actual values of the controlled operating parameter with the values calculated in the predictive mode of operation and for adjusting the boiler operating parameter accordingly;

which can be used to control the operation of dual pressure boilers as well as those that generate steam at a single pressure;

which include control stratagems that optimize the operation of dual pressure steam generators.

And, still another important object of the present invention is the provision of boiler operation control apparatus in accord with the present invention which is reliable, comparatively inexpensive, and easy to service and maintain.

Still another important object of the present invention resides in the provision of steam generating plants equipped with boiler operation control apparatus in accord with the preceding objects.

Other important objects and features and additional advantages of the invention will be apparent from the foregoing and the appended claims and as the ensuing detailed description and discussion proceeds in conjunction with the accompanying drawings.

THE DRAWINGS

DESCRIPTION OF BEST MODES OF CARRYING OUT THE INVENTION

Figure 1:
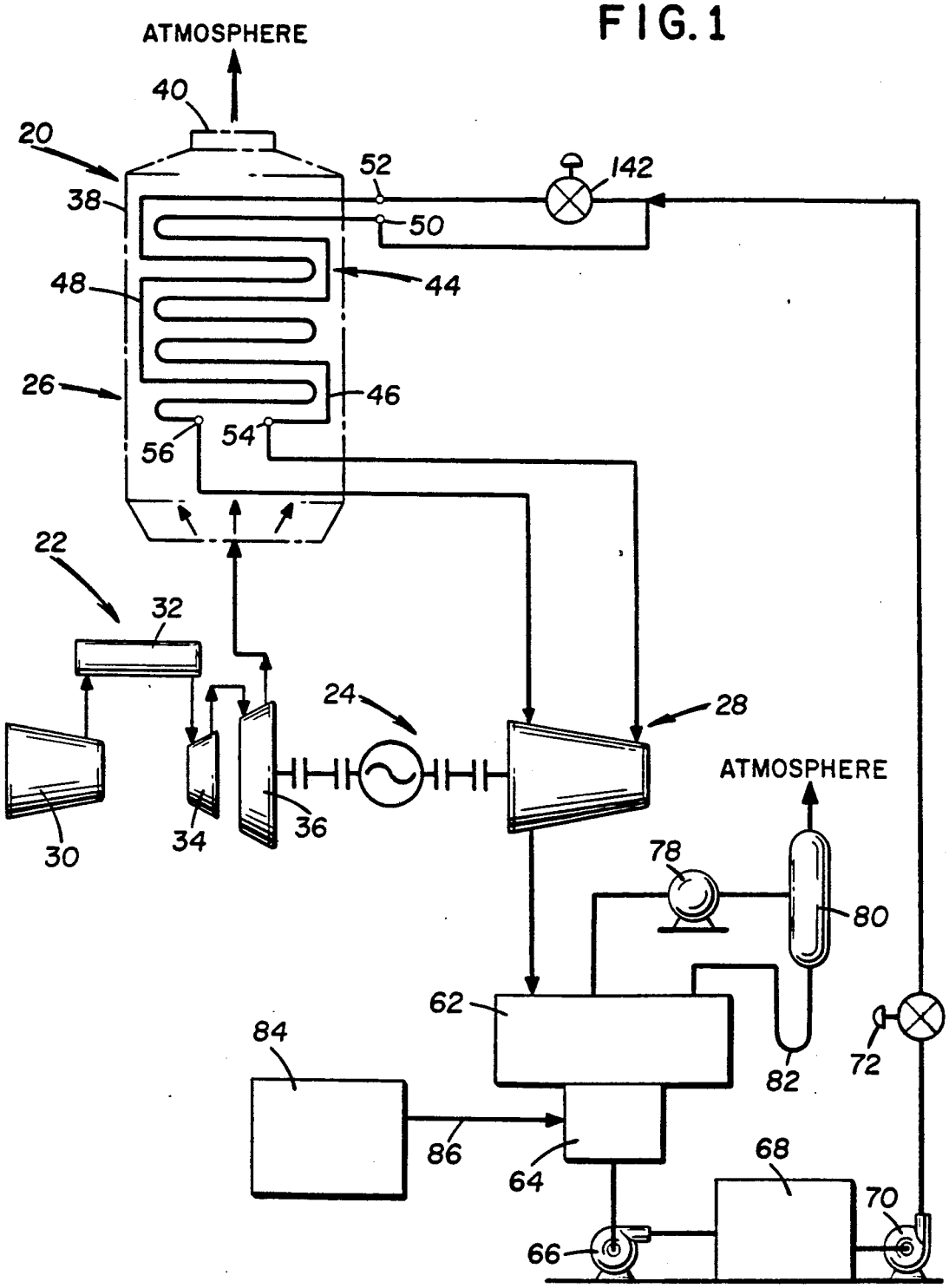
FIG. 1 is a schematic view of a combined cycle power plant with a boiler which is adapted to be controlled in accord with the principles of the present invention.

Referring now to the drawing, FIG. 1 depicts a combined cycle power plant 20 which includes: a gas turbine engine 22 drive connected to an alternator 24; a boiler 26, controlled in accord with the principles of the present invention, in which steam is generated by thermal energy recovered from the hot gases exhausted from gas turbine engine 22; and a steam turbine 28 also drive connected to alternator 24 and employing the steam produced in boiler 26 as a motive fluid.

In power plant 20, steam turbine 28 also drives the exemplary load; viz., alternator 24. However, it can equally well be employed to drive a load which is different from the load being driven by gas turbine engine 22.

For the most part, the components of power plant 20 are of conventional or otherwise familiar construction. Those components will be described herein only to the extent necessary for an understanding of the present invention.

The illustrated gas turbine engine is of conventional configuration; it includes a compressor 30, a combustor 32, a gas producer turbine 34 for driving compressor 30, and a power turbine 36. Hot gases exhausted from power turbine 36 at a temperature in the range of 427°–482° C. are ducted to, and flow through, the casing 38 of steam generator 26. Normally, these gases will be exhausted to atmosphere through stack 40 at a temperature of ca. 112° C. The heat thus recovered in steam generator 26 is 21–25% higher than can be recovered in the unfired boilers heretofore employed in combined cycle power plants.

The boiler 26 illustrated in FIG. 1 has a once-through, dual pressure configuration. It includes a steam generating module 44 which, in one actual boiler design in accord with the principles of the present invention is made up of 40 steam generating circuit assemblies each including a high pressure tube 46 and a low pressure tube 48. In each of these tubes a phase change of water to saturated steam and a change from saturated steam to superheated steam occurs in a continuous flow path extending from the inlet 50 (or 52) to the outlet 54 (or 56) of the tube as the water flows downwardly through the tube in efficient, counterflow relationship to the flow of the hot gas turbine engine exhaust gases. Thus, different regions in each tube function as a feedwater heater, as a vaporizer, and as a superheater.

High pressure steam generated in tubes 46 of boiler 26 flows into the high pressure section of dual pressure steam turbine engine 28, and low pressure steam flows into the low pressure section of the turbine. This turbine may be of any desired construction; for example, that disclosed in U.S. patent application Ser. No. 216,778 which was filed Dec. 17, 1980, and is assigned to the assignee of the present application.

A number of desirable attributes such as reduced maintenance and operating costs, simplification of automatic operation, and elimination of possibilities for operator error are obtained by the use of corrosion resistant materials in boiler 26, thereby eliminating the need for controlling pH and for chemically and/or mechanically controlling the dissolved oxygen content of the boiler feedwater. To this end, tubes 46 and 48 are made of such a material, typically a nickel-chromium-iron containing, high temperature and corrosion resistant alloy (e.g., Incolloy 800).

Steam exhausted from turbine 28 flows into a conventional condenser 62 where the steam is condensed. This component may be, as examples, a water or air cooled condenser of conventional design.

Condensate accumulates in hot well 64 which contains the small inventory of feedwater needed for boiler 26.

That only a small inventory of feedwater is needed to operate boiler 26 is of considerable practical importance. The large mass of saturated water contained in the drums of a conventional boiler, and eliminated in the novel boilers disclosed herein, is a safety hazard and has produced widespread legislation requiring attended operation of steam boilers. By eliminating this large mass of saturated water, the requirement for attended operation can also be eliminated. This is cost effective and, also facilitates remote, unattended operation of combined cycle power plant 20.

From hot well 64, the condensed steam is circulated by condensate pump 66 to a condensate polisher 68, preferably of the character disclosed in copending application No. 483,436 filed Apr. 8, 1983, which is assigned to a common assignee. Here, dissolved solids are removed from the condensate which is then pumped to steam generator 26 by feedwater pump 70 through a modulating type flow control valve 72. This valve is controlled by a system embodying the principles of the present invention, and discussed in detail hereinafter, which matches the feedwater flow rate to the enthalpy in the hot gases supplied to the steam generator from gas turbine engine 22.

As indicated above, it has unexpectedly been found that the fabrication of those boiler components wetted by aqueous fluids eliminates the need for chemically removing dissolved oxygen from the feedwater supplied to boiler 26 or for controlling the pH of the feedwater. However, physical removal of dissolved gases as by hot well deaeration will typically be necessary to maintain an adequate pressure drop across the system. Hot well deaeration is effected by a vacuum pump 78 connected to hot well 64 through condenser 62. Oxygen evacuated from the hot well and condenser by the vacuum pump typically contains appreciable amounts of entrained water. Consequently, the evacuated air is pumped into a conventional separator 80. Air is discharged from separator 80 to atmosphere, and water is returned through trap 82 from separator 80 to condenser 62.

One of the important advantages of the steam generators disclosed herein is that the requirement for make-up of feedwater is nominal For example, one boiler of the type disclosed herein is planned to produce 6,998 kilograms of steam per hour at one exemplary design print. Make-up water requirements for this boiler are less than 2.4 liters per hour. In contrast, make-up water requirements for a conventional blowdown boiler of comparable capacity are ca. 170 liters per hour.

Such make-up water as is required is first circulated through a demineralizer 84 to remove dissolved and suspended solids from the water and then supplied to hot well 64 through make-up water line 86. One suitable demineralizer system is disclosed in above-cited application Ser. No. 483,436.

Figure 2:
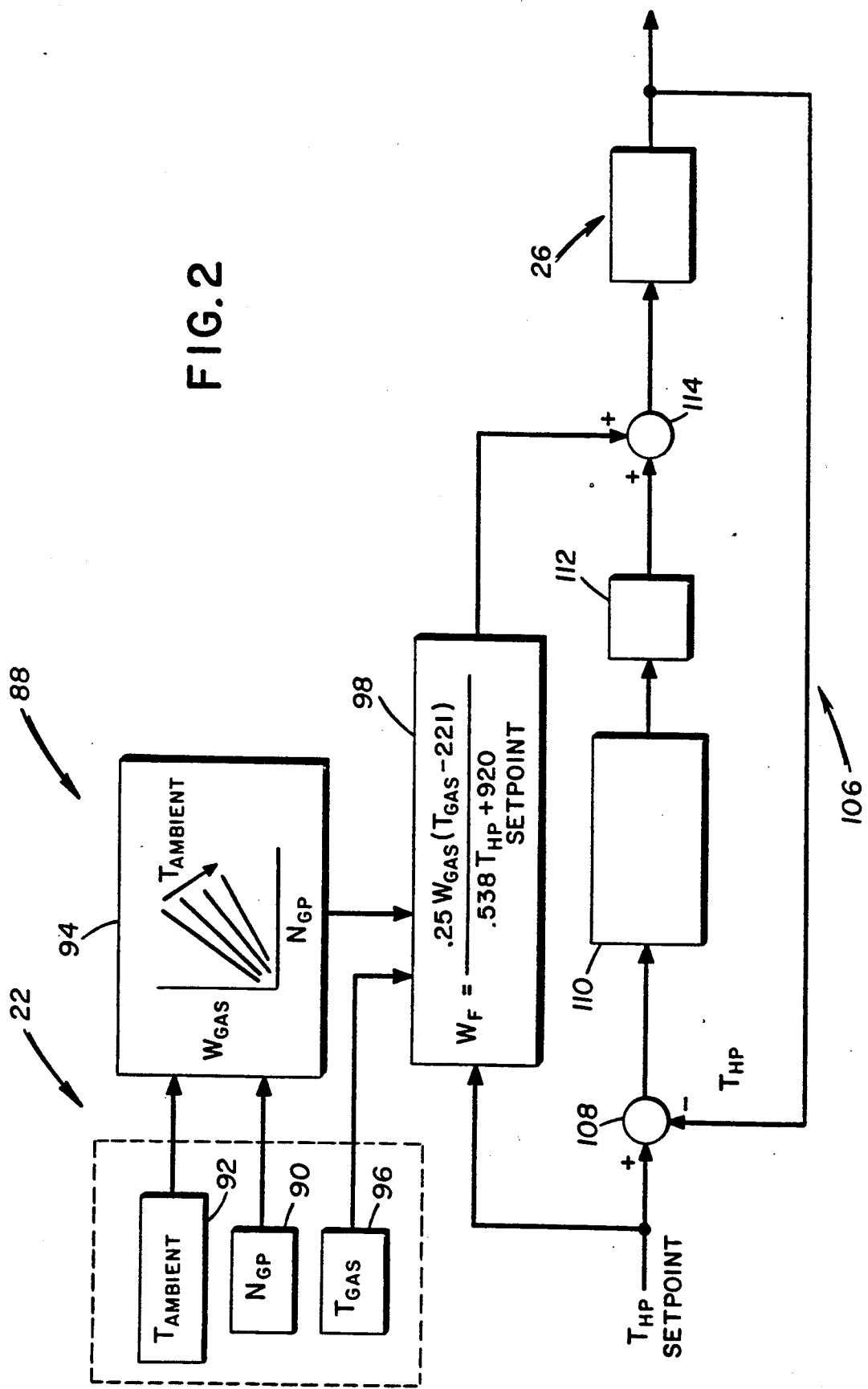
FIG. 2 is a schematic illustration of one controller embodying the principles of the present invention which can be employed to control the operation of the boiler shown in FIG. 1.
Figure 3:
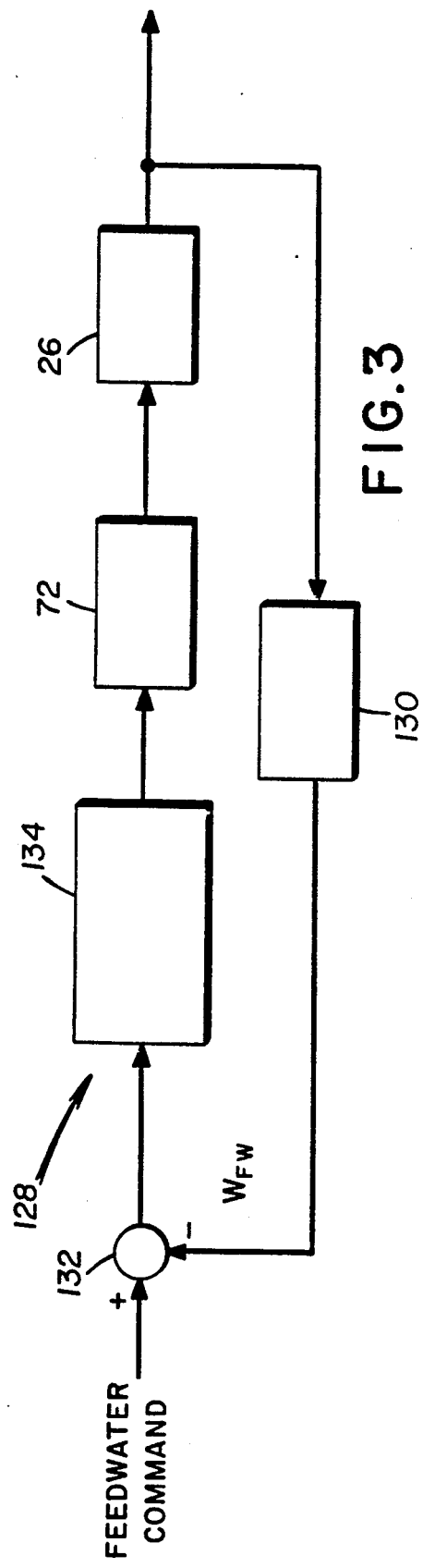
FIG. 3 is a schematic illustration of a subsystem that can be added to the controller of FIG. 2 to afford more accurate control over the operation of the boiler.

Referring still to the drawing, FIGS. 2 and 3 show, schematically, one flow control system (or flow controller) 88 in accord with the principles of the present invention for regulating the flow of feedwater to boiler 26 by modulating the flow of the feedwater through flow control valve 72.

Flow controller 88 employs the above-discussed strategy of recovering the maximum amount of thermal energy from the hot gases supplied to boiler 26 without adjusting the flow of fuel to or otherwise predicating the operation of gas turbine engine 22 on conditions in the boiler; that is, the operation of boiler 26 is subordinated or slaved to the operation of the gas turbine engine.

This strategy can be followed and safe, efficient operation of boiler 26 obtained in an extremely simple fashion by controlling only the flow of feedwater to the boiler, this control being so effected as to maintain only one parameter within specified limits. This parameter is the approach temperature of boiler 26 which is defined as the temperature of the hot gases supplied to the boiler minus the temperature of the high pressure steam generated in the boiler.

Controller 88 achieves this goal by calculating the energy available from the hot gases supplied to boiler 26 and the maximum amount of steam that can thereby be produced within the foregoing constraint and adjusting feedwater flow valve 72 accordingly.

The energy added to the feedwater to generate steam equals the energy recoverable from the gas turbine engine exhaust gases. Because outlets 54 and 56 (see FIG. 1) are fixed restrictions, that energy balance can be approximated by:

$$(C_{PFW} \cdot \Delta T_{FW} + h_{fg}) W_{FW} = W_{gas} C_{gas} \Delta T_{gas} \qquad (1)$$

where:
$C_{PFW}$ = the average specific heat of steam on the water side of the boiler at design point,
$\Delta T_{FW} = T_{out} - T_{in}$ = the increase from feedwater temperature to steam outlet to temperature,
$h_{fg}$ = the latent heat of vaporization of water,
$\Delta T_{gas}$ = the change in temperature of turbine exhaust gases in the boiler,
$W_{FW}$ = the mass flow of feedwater through the boiler,
$W_{gas}$ = the mass flow of hot gas supplied to the boiler from the gas turbine engine as calculated from measured operating parameters of gas turbine engine 22, and
$C_{gas}$ = the specific heat of the hot gases supplied to the boiler.

Certain set points were established to optimize the generation of steam in the boiler 26 of combined cycle power plant 20. The first was that the temperature of the gas leaving the boiler should be 221° F. Thus, $\Delta T_{gas} - 221°$ F., where $T_{gas}$ is the temperature of the gas being supplied to boiler 26 and is a measured parameter. The specific heats $C_{gas}$ and $C_{PFW}$ were assigned average values of $C_{gas} = 0.25$ and $C_{PFW} = 0.538$. The water inlet temperature, $T_{in}$, is relatively constant and was assigned an average value of 92° F.

With the foregoing, the feedwater equation can be rewritten as follows:

$$W_{FW} = \frac{W_{gas} \cdot (T_{gas} - 221°\text{ F.}) C_{gas}}{C_{PFW}(T_{HP} - T_{gas}) + h_{fg}} \quad (2)$$

The term $h_{fg}$ is relatively constant and was replaced by an assigned value. As $C_{PFW}$ and $T_{in}$ are relatively constant, values assigned to these parameters were multiplied together and added algebraically to the value assigned to $h_{fg}$. The resulting figure was 920.

As discussed above, the maximum amount of dry steam (within constraints) can be produced if $T_{HP}$, the outlet steam temperature, is kept within a specified number of degrees of $T_{gas}$. This difference, termed the approach temperature is defined by the equation, $T_{APP} = T_{gas} - T_{HP}$.

The expression $(T_{HP} - T_{gas})$ is preferably replaced by one which takes the wanted approach temperature into account and is:

$$H_{HP\,SETPOINT} = T_{gas} - \Delta T_{APP} \quad$$

where $\Delta T_{APP}$ is an assigned value or is calculated from $T_{gas}$.

Thus with all assigned values substituted, the feedwater flow control algorithm becomes:

$$W_{FW} = \frac{0.25\, W_{gas}(T_{gas} - 221)}{0.538\, T_{HP\,SETPOINT} + 920} \quad (3)$$

The only variables in the open loop, predictive mode of operation afforded flow controller 88 by the feedwater flow control algorithm (3) are the mass flow and temperature of the gases supplied to boiler 26.

The mass flow of exhaust gases available from turbine engine 22 ($W_{gas}$) is proportional to the speed of gas producer turbine 34 for any given ambient temperature of the air introduced into compressor 30. Consequently, controller 88 is designed to convert the speed and ambient air temperature information from sensors 90 and 92 into a mass flow value. This can be done with a conventional function generator 94 designed to make the calculations shown in graphical fashion in FIG. 2. The $W_{gas}$ value and the gas temperature (measured by a sensor 96 such as a thermocouple) are transmitted to calculation block 98 as is the selected value of $T_{HP\,SETPOINT}$. Calculation block 98 solves the equation or algorithm (3) discussed above, generating a feedwater flow signal $W_{FW}$. This signal is transmitted to the (typically) electropneumatic actuator (not shown) of feedwater flow valve 72 to regulate the flow of feedwater to boiler 26 in accord with the operating strategy discussed above.

In one exemplary controller embodying the principles of the present invention, the input data for the feedwater flow control equation is collected at a rate of ten times per second, and $W_{FW}$ is recalculated after each update in the input data. The significant result of updating the input data and recalculating $W_{FW}$ at this frequency is that the feedwater flow rate is for all practical purposes based on a prediction rather than results at the boiler input. This is important because the transit time of the water through the boiler is measured in minutes; and, if output results were the only control factor, regulation of the feedwater flow would be based on obsolete data.

Figure 4:
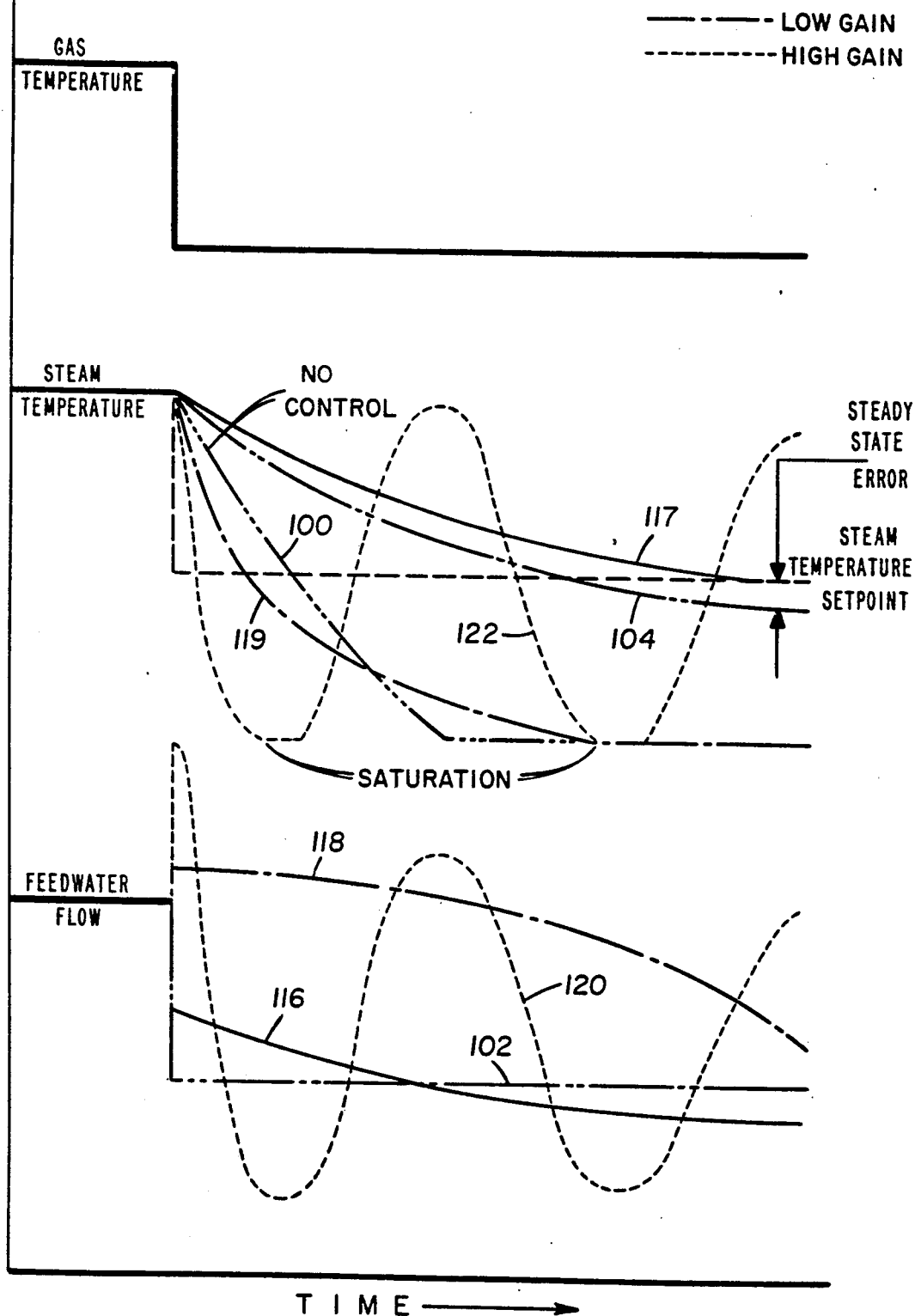
FIG. 4 shows, graphically, the effect of different types of control on boiler operation.

FIG. 4 shows, graphically, the effect on steam temperature (and thus steam quality) of a temperature change in the hot gases supplied to boiler 26. In the case of a rapid drop in the exhaust gas temperature and no feedwater control, the steam temperature will drop; and the steam will rapidly become saturated (undesirable) as shown by curve 100.

On the other hand, if the feedwater flow is regulated by the predictive flow control equation discussed above, the feedwater flow will be decreased as the gas temperature drops as shown by curve 102. As a result, the steam temperature will stabilize at a temperature approaching the selected setpoint as shown by curve 104.

Even better control over the generation of steam in boiler 26 can be gained in some circumstances by adding to the open loop, predictive mode flow control discussed above the feedback loop 106 shown in FIG. 2. Typically, this closed loop mode of control will be made operator selectable.

The closed loop, feedback mode of control is employed to compensate for inherent drifts in the predictive flow control equation (drift factors may cause significant errors in the predictive equation).

Drift may be caused by, for example, miscalibration of valve 72, fouling of steam generating tubes 46 and 48, inaccuracies in the mass flow calculation made by function generator 94, and signific variations in $T_{EX}$ from the assigned value.

In the closed loop mode of boiler control a corrected feedwater flow rate and a feedwater flow correction factor $W_{CLCF}$ are generated in accord with the equations:

$$FW_{TOTAL} = W_{FW} + W_{CLCF} \quad (4)$$

and $$W_{CLCF} = -[(T_{GAS} - T_{APP}) - T_{HP}]K_{CLCF} \quad (5)$$

$FW_{TOTAL}$ = the newly computed feedwater flow including the closed loop correction, in lb/hr, $T_{HP}$ = the measured high pressure outlet steam temperature, and $K_{CLCF}$ = a gain coefficient for converting temperature to feedwater flow.

The gain coefficient is assigned a value of 4 lb/hr/°F., $$T_{APP} = 80 \text{ if } T_{GAS} \geq 720,$$
and
$$T_{APP} = 68 - \frac{751 - T_{GAS}}{8} \text{ if } T_{GAS} < 720.$$

The reason for adopting a variable approach temperature is that a fixed approach temperature does not guarantee a sufficient margin of superheat when gas turbine engine 22 is operating under part load.

The steam output temperature, $T_{HP}$, is measured by any desired technique, for example by a thermocouple, and summed in an adder 108 with $T_{HP\,SETPOINT}$.

This produces an error signal which is converted as by a conventional PI controller 110 into a control signal compatible with that generated in function generator 98. This latter signal is inverted in inverter 112 and summed with the predictive feedwater flow ($W_{FW}$) signal in adder 114, producing the new feedwater flow command signal ($F_{W\,TOTAL}$) for operating the electropneumatic actuator of feedwater flow control valve 72.

Curve 116 in FIG. 4 shows how the feedwater flow is regulated when the closed loop correction factor is used in conjunction with the predictive flow value to control valve 72. In the same Figure, curve 117 shows that this combination of predictive and closed loop modes of operation can be taken advantage of to maintain the steam output temperature at the selected setpoint.

It is of course theoretically possible to control feedwater flow solely by the use of a feedback loop as shown in FIG. 2 without simultaneously employing predictive flow control. However, FIG. 4 makes it clear that this will not provide the desired results; viz., the generation of dry steam and the maximum recovery of thermal energy (which requires that the steam temperature be maintained as closely as possible to the steam temperature setpoint). If the gain in the feedback control is set low, the result of a change in gas temperature as shown in FIG. 4 is overdamping as indicated by curves 118 and 119, and the steam rapidly becomes saturated. On the other hand, if a high gain feedback correction signal is employed to control the feedwater flow, oscillation occurs as indicated by curves 120 and 122; and unstable, inefficient boiler operation with periodic generation of saturated steam is the result.

It is preferred, in feedwater flow control systems employing the principles of the present invention, that the actual feedwater flow be measured and that any differences between the measured and command values be employed to correct the feedwater flow. A subsystem for accomplishing this function in controller 88 is illustrated in FIG. 3 and identified by reference character 128.

In this subsystem, the flow of steam from boiler 26 is measured and converted to a measured feedwater flow rate in function generator 130. This signal is summed with the feedwater flow command signal $W_{FW}$ or $W_{FW\ TOTAL}$ in adder 132. The resulting error signal is converted to a new feedwater flow command signal in a fast response (PID) controller 134; and the new command signal is utilized to operate the electropneumatic actuator of feedwater flow control valve 72.

As discussed above, the illustrated boiler 26 is of the dual pressure type, including as it does two independent circuits composed respectively of tubes 46 and 48 in which steam is generated at high and low pressures. Optimal operation of a boiler within the principles of the present invention can be furthered by splitting the dual pressure feedwater flow between the tubes 46 and 48 in accord with a particular flow split; viz., that obtained by dividing the high pressure steam flow by the low pressure steam flow.

Figure 5:
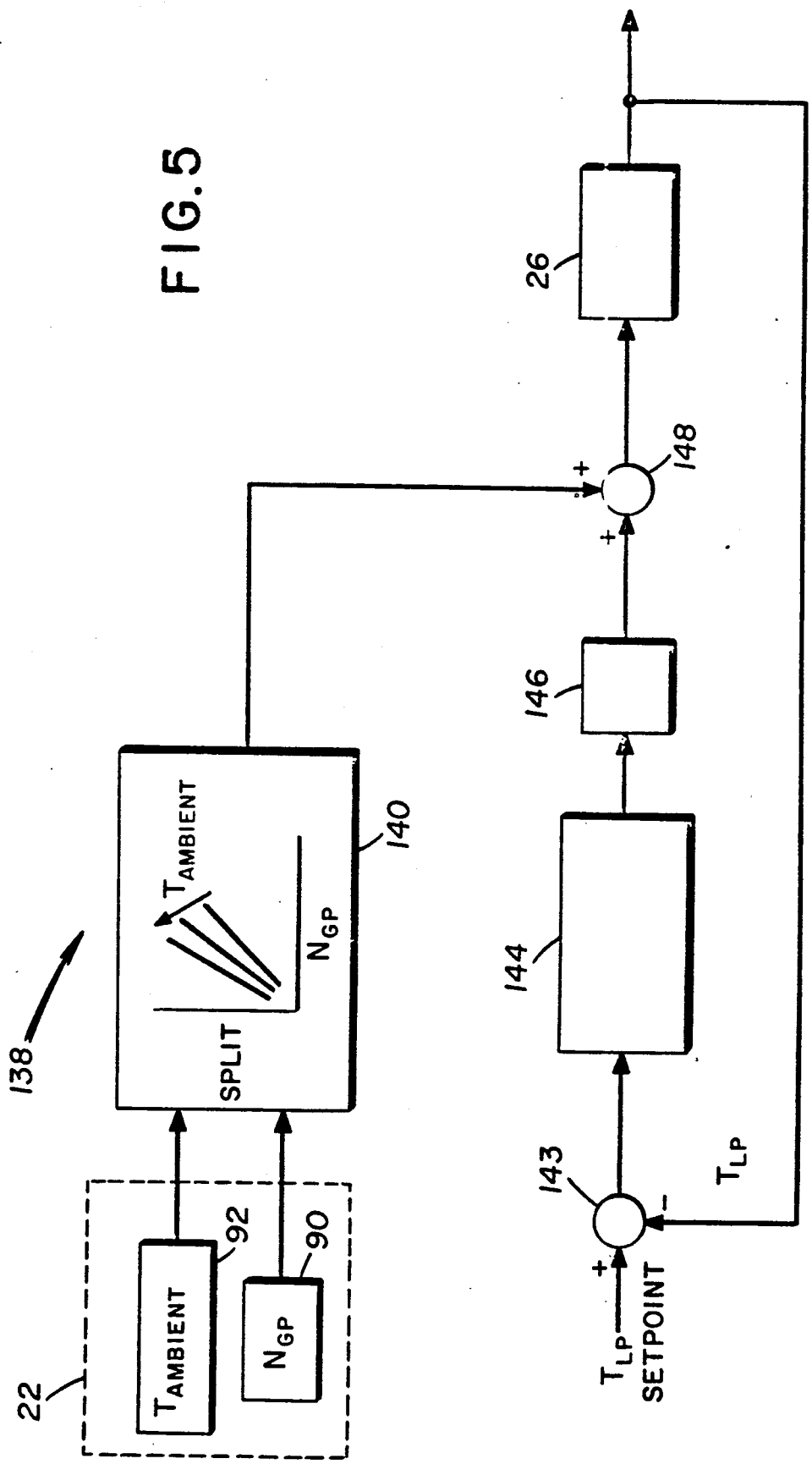
FIG. 5 shows, schematically, a subsystem which can be added to the controller of FIG. 2 in applications involving dual pressure boilers to make the operation of the boiler more efficient.

A subsystem designed to provide this additional degree of control is illustrated in FIG. 5 and identified by reference character 138.

As in the case of predictive feedwater flow, the feedwater split or ratio can be determined from the ambient temperature of the air supplied to gas turbine engine compressor 30 and the speed of gas producer turbine 34. The values of these two parameters, obtained from sensors 90 and 92, are combined into a flow split signal by function generator 140 in accord with the calculations shown graphically in FIG. 5. This flow split or ratio signal is applied to the operator (again typically electropneumatic) of a flow proportioning valve 142 in series with feedwater flow control valve 72 (see FIG. 1) to proportion the flow of feedwater between the high and low pressure steam generating tubes 46 and 48 in boiler 26.

Also, in the case of a dual pressure boiler, boiler operation is preferably further optimized by employing feedback to correct the feedwater flow split signal.

Specifically, as shown in FIG. 5, the controller for a dual pressure boiler may have an input for a $T_{LP\ SETPOINT}$ which is analogous to, and provided for essentially the same purposes as, the $T_{HP\ SETPOINT}$ discussed above; viz., to insure an adequate degree of superheat in the low pressure steam and maximum recovery of the heat from the hot gases on which boiler 26 is operated.

In the feedback mode of operation, which again is preferably operator selectable, the temperature of the low pressure steam is measured, as by a thermocouple, and the resulting signal is summed with that representing $T_{LP\ SETPOINT}$ in adder 143.

The resulting error signal is converted to a control signal in PI controller 144, and is inverted in inverter 146. This produces a signal which is combined with the feedwater flow split command signal from function generator 140 in adder 148, producing a command signal which is, again, applied to the actuator of proportioning valve 142.

Figure 6:
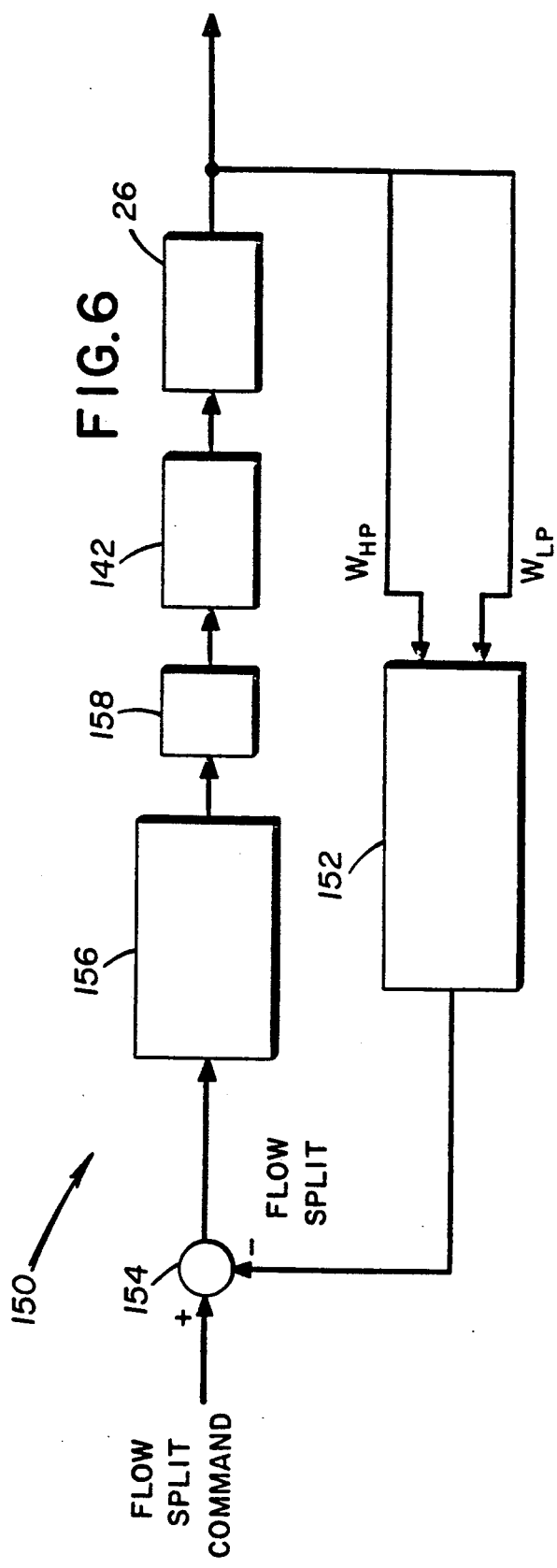
FIG. 6 is a schematic representation of yet another subsystem that can be used in conjunction with that shown in FIG. 5 to make the operation of a dual pressure boiler more efficient.

Still another degree of refinement, and increase in boiler performance, can be obtained in the case of a dual pressure boiler by comparing the actual split of feedwater with the predictive flow split and adjusting flow proportioning valve 142 accordingly. This subsystem is shown in FIG. 6 and identified by reference character 150.

In the illustrated subsystem, the flow of high pressure and low pressure steam from boiler 26 are measured and signals indicative of the resulting mass flows converted to a flow split value in function generator 152 in accord with the equation:

$$\text{Split} = \frac{W_{FW} - W_{LPFW}}{W_{LPFW}} = \frac{W_{HP}}{W_{LP}} \quad (6)$$

where:

$W_{LPFW}$ = the low pressure steam flow, and $W_{FW} - W_{LPFW}$ = the high pressure steam flow.

The resulting signal is summed with the flow split command signal from function generator 140 or adder 148 in adder 154, producing an error signal which is converted to a command signal in PID controller 156. That signal is inverted in inverter 158 and, as discussed previously, applied to the actuator of flow proportioning valve 142.

It is reiterated, in conjunction with the foregoing detailed description of the invention, that the novel feedwater flow controllers described herein are across-the-board applicable to once through, unfired boilers. In particular, as the control strategy involves only an energy or enthalpy balance between the hot gases supplied to the boiler and steam generated in the boiler, and as the only variable inputs to the controller can be measured or calculated (gas temperature and mass flow) or can be assigned constant values, it will be readily apparent to the reader that the principles of the present invention are applicable independent of the source of the waste heat.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. The combination of an unfired boiler having a high pressure steam generating circuit means and a low pressure steam generating circuit means, a source of thermal energy for said boiler, means for effecting a flow of feedwater to said boiler, a controller for controlling the operation of said boiler, said controller including means for periodically calculating the energy available to said boiler from said thermal energy source and the quantity of dry steam that can be generated by the transfer of said energy to said feedwater, means under the direction of said controller for so modulating the flow of feedwater to said boiler as to supply to said boiler the quantity of feedwater that can be turned into steam as aforesaid by the transfer of said thermal energy thereto, and means for proportioning the flow of feedwater between said high pressure steam generating circuit means and said low pressure steam generating circuit means in accord with the ratio $$W_{HP}/W_{LP},$$

where:

$W_{HP}$ is the mass flow of the steam generated in the high pressure steam generating circuit means, and $W_{LP}$ is the mass flow of the steam generated in the low pressure steam generating circuit means.

2. A combination as defined in claim 1 wherein said controller has calculating means as aforesaid for calculating the quantity of steam having a setpoint temperature which is an assigned or calculated number of degrees lower than the temperature of the thermal energy source that can be generated by the transfer of said energy to the feedwater supplied to said high pressure steam generating circuit means, means for measuring the temperature of the steam discharged from said high pressure steam generating circuit means and for adding a signal representative of that temperature to a signal representative of the setpoint temperature to generate an error signal, means for converting said error signal to a feedwater flow correction signal, means for adding said feedwater flow correction signal to a flow indicative signal generated in said predictive mode of operation to generate a corrected flow command signal, and means for transmitting said corrected flow command signal to said flow modulating means.

3. A combination as defined in claim 1 which has a feedwater flow proportioning means upstream of said high and low pressure steam generating circuit means and wherein said controller has means for generating first and second signals indicative of the flow of the feedwater actually passed through said boiler and through said low pressure steam generating circuit means, means for converting said first and second signals to a flow split signal in accord with the ratio $$\frac{W_{FW} - W_{LPFW}}{W_{LPFW}},$$

where:

$W_{FW}$ is the total measured flow of feedwater through the boiler, and $W_{LPFW}$ is the measured flow of the feedwater through the low pressure steam generating circuit means;

means for adding the just mentioned flow split signal to the flow split signal indicative of the proportioning of said feedwater between said high and low pressure steam generating circuit means to create a flow split error signal, means for converting said error signal to a flow split command signal, and means for transmitting said flow split command signal to said feedwater flow proportioning means.

4. A combination as defined in claim 3 wherein said controller has calculating means as aforesaid for calculating the quantity of steam having a setpoint temperature which is an assigned or calculated number of degrees lower than the temperature of the thermal energy source that can be generated by the transfer of said energy to the feedwater supplied to said high pressure steam generating circuit means, means for measuring the temperature of the steam discharged from said high pressure steam generating circuit means and for adding a signal representative of that temperature to a signal representative of the setpoint temperature to generate an error signal, means for converting said error signal to a feedwater flow correction signal, means for adding said feedwater flow correction signal to a flow indicative signal generated in said predictive mode of operation to generate a corrected flow command signal, and means for transmitting said corrected flow command signal to said flow modulating means.

5. A combination as defined in claim 1 wherein said controller has calculating means as aforesaid for calculating the quantity of steam having a setpoint temperature which is an assigned or calculated number of degrees lower than the temperature of the thermal energy source that can be generated by the transfer of said energy said to the feedwater supplied to said low pressure steam generating circuit means, means for measuring the temperature of the steam discharged from said low pressure steam generating circuit means and for adding a signal representative of that temperature to a signal representative of the setpoint temperature to generate an error signal, means for converting said error signal to a flow split correction signal, means for adding said flow split correction signal to the flow split correction signal generated in accord with the aforesaid ratio $W_{HP}/W_{LP}$ to generate a corrected flow split command signal, and means for transmitting said corrected flow split command signal to said flow proportioning means.

6. A combination as defined in claim 5 wherein said controller has means as aforesaid for calculating the quantity of steam having a setpoint temperature which is an assigned or calculated number of degrees lower than the temperature of the thermal energy source that can be generated by the transfer of said energy to the feedwater supplied to said high pressure steam generating circuit means, means for measuring the temperature of the steam discharged from said high pressure steam generating circuit means and for adding a signal representative of that temperature to a signal representative of the setpoint temperature to generate an error signal, means for converting said error signal to a feedwater flow correction signal, means for adding said feedwater flow correction signal to a flow indicative signal generated in said predictive mode of operation to generate a corrected flow command signal, and means for transmitting said corrected flow command signal to said flow modulating means.

7. The combination of an unfired boiler, a source of thermal energy for said boiler, means for effecting a flow of feedwater to said boiler, means for effecting a flow of hot gases from said thermal energy source to and through said boiler, a controller for periodically calculating the energy available to said boiler from said thermal energy source and the quantity of dry steam that can be generated by transfer of thermal energy said to feedwater from said hot gases to said feedwater in accord with the algorithm:

$$W_{FW} = \frac{0.25\ W_{gas}\ (T_{gas} - 221)}{0.538\ T_{HP\ SETPOINT} + 920},$$

where
$W_{FW}$ = the mass flow of feedwater through the boiler,
$W_{gas}$ = the mass flow of hot gases supplied to the boiler from the thermal energy source,
$T_{gas}$ = the change in temperature of the hot gases in the boiler, and
$T_{HP\ SETPOINT}$ = the selected temperature at which steam is to be discharged from the boiler, and flow control means for modulating the flow of feedwater to said boiler at the rate $W_{FW}$ calculated by said controller and thereby supplying to said boiler the quantity of feedwater that can be turned into said steam by the transfer of said thermal energy thereto from said hot gases.

8. A combination as defined in claim 7 wherein said controller has means for adding a correction factor to the feedwater flow value $W_{FW}$ to compensate for drift in accord with the algorithm:

$$FW_{TOTAL} = W_{FW} + W_{CLCF},$$

where
$W_{CLCF} = -[(T_{GAS} - T_{APP}) - T_{HP}]\ K_{CLCF}$ and:
$FW_{TOTAL}$ = the newly computed feedwater flow including the correction,
$T_{HP}$ = the measured high pressure outlet steam temperature,
$T_{APP} = T_{GAS} - T_{HP}$,
$T_{CLCF}$ = a gain coefficient for converting temperature to feedwater flow,
$T_{APP} = 80$ if $T_{GAS} > 720$, and
$T_{APP} = 68 - (751 - T_{GAS}/8)$ if $T_{GAS} < 720$.

9. The combination of an unfired boiler; a source of thermal energy for said boiler; means for effecting a flow of feedwater to said boiler; means for effecting a flow of hot gases from said thermal energy source to and through said boiler; a controller for periodically calculating the energy available to said boiler from said thermal energy source and the quantity of dry steam that can be generated by transfer of said energy from said hot gases to said feedwater in accord with the algorithm:

$$W_{FW} = \frac{W_{gas}\ C_{gas}\ \Delta T_{gas}}{(C_{PFW} \cdot \Delta T_{FW} + h_{fg})}$$

where:
$W_{FW}$ = the mass flow of feedwater through the boiler,
$C_{PFW}$ = the average specific heat of the steam of the water side of the boiler at design point,
$\Delta T_{FW} = T_{out} - T_{in}$ = increase from feedwater temperature to steam outlet temperature,
$h_{fg}$ = the latent heat of vaporization of water,
$\Delta T_{gas}$ = the change in temperature of the hot gases in the boiler,
$W_{as}$ = the mass flow of hot gas as supplied to the boiler from the thermal energy source, and
$C_{gas}$ = the specific heat of the hot gases supplied to the boiler;

flow control means for modulating the flow of feedwater to said boiler at the rate $W_{FW}$ calculated by said controller and thereby supplying to said boiler the quantity of feedwater that can be turned into said steam by the transfer of said thermal energy thereto from said hot gases; and means for adding a correction factor to the feedwater flow valve $W_{FW}$ to compensate for drift in accord with the algorithm:

$$FW_{TOTAL} = W_{FW} + W_{CLCF}$$

where
$W_{CLCF} = -[(T_{GAS} - T_{APP}) - T_{HP}] K_{CLCF}$ and
$FW_{TOTAL}$ = the newly computed feedwater flow including the correction,
$T_{HP}$ = the measured high-pressure outlet steam temperature,
$T_{APP} = T_{GAS} - T_{HP}$, and
$K_{CLCF}$ = a gain coefficient for converting temperature to feedwater flow.

* * * * *

UNITED STATES PATENT AND TRADEMARK OFFICE
CERTIFICATE OF CORRECTION

PATENT NO. : 5,237,816

DATED : August 24, 1993

INVENTOR(S) : Thomas E. Duffy et al.

It is certified that error appears in the above-identified patent and that said Letters Patent is hereby corrected as shown below:

Claim 8, column 13, line 48 " $>$ " should be " $\geq$ ".

Claim 9, column 14, line 17 "of" second occurance should be "on".

line 24 "$W_{as}$" should be "$W_{gas}$".

Signed and Sealed this

Thirty-first Day of May, 1994

Attest:

Attesting Officer

BRUCE LEHMAN

Commissioner of Patents and Trademarks